United States Patent
Petroianu et al.

(10) Patent No.: US 8,450,964 B2
(45) Date of Patent: May 28, 2013

(54) METHOD OF FORMING A CONTROL CIRCUIT AND DEVICE

(75) Inventors: Alexandra-Oana Petroianu, Bucharest (RO); Gabriel Codrin Aungurencei, Sunnyvale, CA (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 841 days.

(21) Appl. No.: 12/367,667

(22) Filed: Feb. 9, 2009

(65) Prior Publication Data

US 2010/0201305 A1   Aug. 12, 2010

(51) Int. Cl.
- *H01M 10/44* (2006.01)
- *H01M 10/46* (2006.01)
- *H02J 7/00* (2006.01)

(52) U.S. Cl.
USPC ........... 320/101; 320/103; 320/134; 323/906; 136/291; 136/293

(58) Field of Classification Search
CPC ........................................................ H02J 7/35
USPC .................................................. 320/101, 102
See application file for complete search history.

(56) References Cited

U.S. PATENT DOCUMENTS

| | | | | |
|---|---|---|---|---|
| 5,869,949 | A * | 2/1999 | Nishikawa et al. | 320/101 |
| 6,301,198 | B1 * | 10/2001 | Otaka et al. | 368/205 |
| 7,514,900 | B2 * | 4/2009 | Sander et al. | 320/101 |
| 7,521,898 | B2 * | 4/2009 | Kobayashi | 320/162 |
| 7,834,580 | B2 * | 11/2010 | Haines | 320/101 |
| 2006/0164031 | A1 * | 7/2006 | Leem | 320/101 |
| 2007/0182362 | A1 * | 8/2007 | Trainor et al. | 320/101 |
| 2008/0029153 | A1 * | 2/2008 | Margalit | 136/252 |
| 2008/0094024 | A1 * | 4/2008 | Li | 320/101 |
| 2008/0150488 | A1 * | 6/2008 | Lu et al. | 320/134 |
| 2008/0278983 | A1 * | 11/2008 | Park | 363/95 |
| 2009/0039797 | A1 * | 2/2009 | Wang et al. | 315/246 |
| 2009/0058353 | A1 * | 3/2009 | Jung | 320/101 |
| 2009/0058363 | A1 * | 3/2009 | Platania et al. | 320/134 |
| 2009/0302681 | A1 * | 12/2009 | Yamada et al. | 307/46 |
| 2009/0316392 | A1 * | 12/2009 | Chou | 362/183 |
| 2010/0008098 | A1 * | 1/2010 | Vernon | 362/487 |
| 2010/0013428 | A1 * | 1/2010 | Shin | 320/101 |
| 2010/0026233 | A1 * | 2/2010 | Lee et al. | 320/101 |
| 2010/0066301 | A1 * | 3/2010 | Chen et al. | 320/101 |
| 2010/0109613 | A1 * | 5/2010 | Chuang et al. | 320/166 |
| 2010/0116565 | A1 * | 5/2010 | Jang et al. | 180/2.2 |
| 2010/0123428 | A1 * | 5/2010 | Wu et al. | 320/102 |
| 2010/0148851 | A1 * | 6/2010 | Holzmann | 327/437 |

OTHER PUBLICATIONS

Linear Technology, Data Sheet, "LTC3490 Single Cell 35mA LED Driver", Copyright Linear Technology Corporation 2005, LT0606 Rev A, 12 pages.
Data Sheet, GENERALPLUS Technology Inc., "GPWL8938A 1.3V Solar Garden Lamp", Mar. 27, 2007, Version 1.1, 10 pages.
Data Sheet, MAXIM "1A, 97% Efficiency, 30uA Quiescent Current Step-Up Converter with True Shutdown", 19-4092, Rev 1; Aug. 2008, Copyright 2008 Maxim Integrated Products, 15 pages.

* cited by examiner

*Primary Examiner* — Drew A Dunn
*Assistant Examiner* — Nathaniel Pelton
(74) *Attorney, Agent, or Firm* — Robert F. Hightower

(57) ABSTRACT

In one exemplary embodiment, a control circuit includes a comparator circuit that compares a solar cell voltage and a battery voltage and responsively activates a charging control signal if the solar cell voltage is greater than the battery voltage. If the solar cell voltage is not greater than the battery voltage, the comparator circuit deactivates the charging control signal.

18 Claims, 3 Drawing Sheets

METHOD OF FORMING A CONTROL CIRCUIT AND DEVICE

BACKGROUND OF THE INVENTION

The present invention relates, in general, to electronics, and more particularly, to semiconductors, structures thereof, and methods of forming semiconductor devices.

In the past, solar powered garden lights typically charged a battery from a solar cell during daylight conditions, and then used the charged battery to power an LED during nighttime conditions. The battery was typically charged by coupling the battery to the solar cell through a diode or a diode-connected transistor. The diode or diode-connected transistor introduced a voltage drop of about 0.7 Volts, which reduced the efficiency of the battery charging operation. Moreover, leakage through the diode or diode-connected transistor often reduced the efficiency of the charging operation.

The decision to power the LED usually was typically made in response to comparing the battery voltage with a voltage from a photo resistor. This comparison undesirably required a comparator, which usually was continuously powered from the battery, thereby undesirably increasing the power requirements of the system and reducing the efficiency of charging the battery. Additionally, the photo-resistor often was another system element which increased the costs.

The LED was typically powered by charging an inductor during one phase of a clock signal, and then discharging the inductor to supply current to the LED during another phase of the clock signal. The current flow to the LED was controlled by controlling the pulse width of the phases of the clock signal. However, the required pulse width modulation circuitry was fairly complex, and resulted in significant power consumption.

A capacitor often typically was connected in parallel with the LED, such that the capacitor was charged during the time that the inductor discharged to power the LED. The charged capacitor could then supply the LED during the period while the inductor was subsequently recharged. However, during the inductor discharge phase, it was possible that the inductor may remain electrically connected to the LED and capacitor after the inductor had been completely discharged. Under such conditions, charge could undesirably flow from the capacitor back into the inductor (reverse charge flow) at the end of the discharge phase.

It would therefore be desirable to have an improved solar powered garden light that operates more efficiently than conventional solar-powered lights, and that has a lower cost.

For simplicity and clarity of the illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, or certain N-type or P-type doped regions, a person of ordinary skill in the art will appreciate that complementary devices are also possible in accordance with the present invention. It will be appreciated by those skilled in the art that the words during, while, and when as used herein relating to circuit operation are not exact terms that mean an action takes place instantly upon an initiating action but that there may be some small but reasonable delay, such as a propagation delay, between the reaction that is initiated by the initial action. The use of the word approximately or substantially means that a value of an element has a parameter that is expected to be very close to a stated value or position. However, as is well known in the art there are always minor variances that prevent the values or positions from being exactly as stated. It is well established in the art that variances of up to at least ten percent (10%) are reasonable variances from the ideal goal of exactly as described.

DETAILED DESCRIPTION OF THE DRAWINGS

Figure 1:
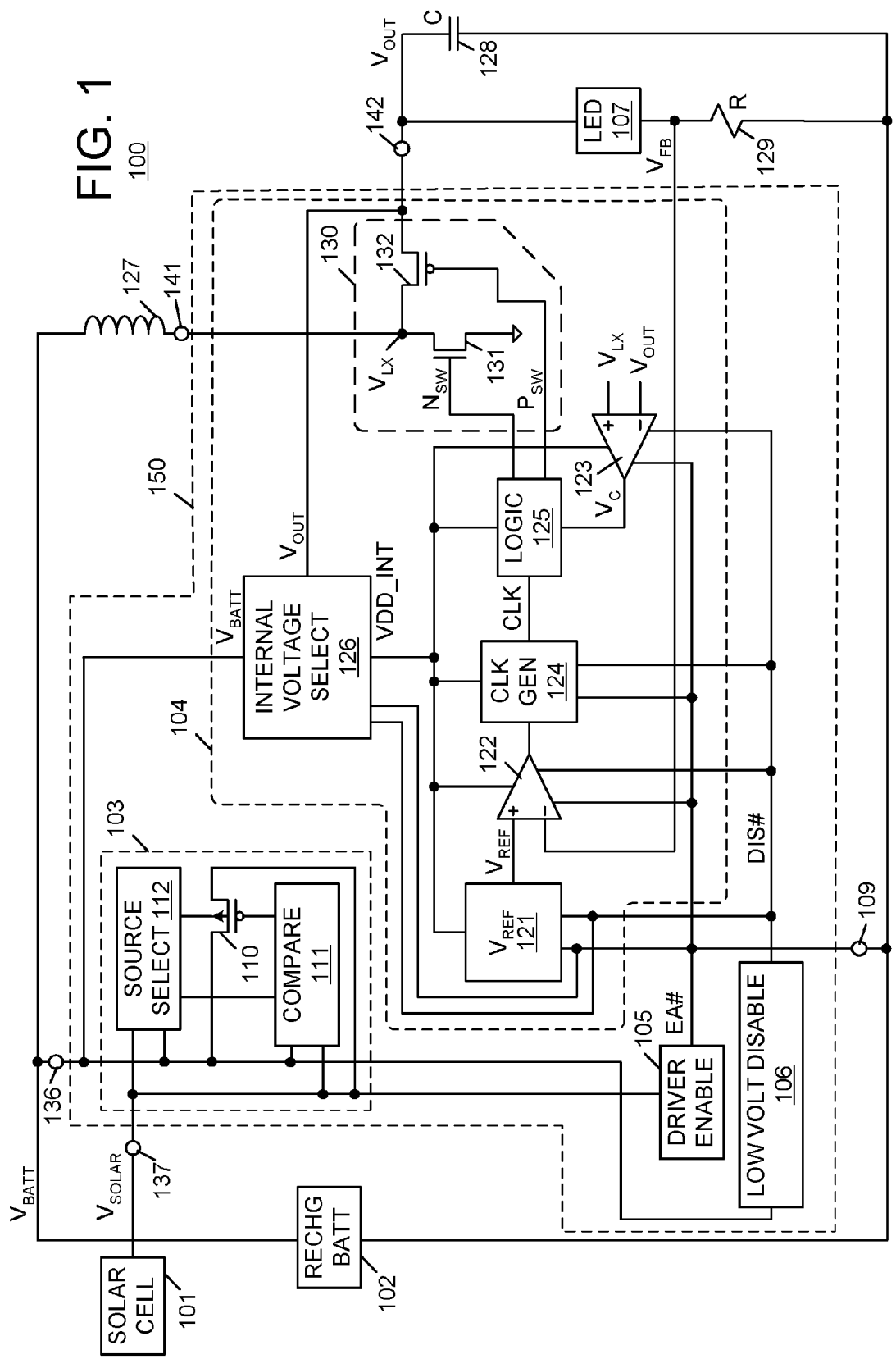
FIG. 1 schematically illustrates an embodiment of a portion of a block diagram of a solar-powered light system that includes a control circuit in accordance with the present invention.

FIG. 1 schematically illustrates an exemplary embodiment of a portion of a solar-powered light system 100 that includes a control circuit 150 (illustrated in general by dashed lines). As will be seen more fully hereinafter, in one embodiment control circuit 150 includes a battery charging circuit coupled to receive a solar cell voltage from a solar cell and a battery voltage from a rechargeable battery, wherein the battery charging circuit is configured to charge the rechargeable battery from the solar cell when the solar cell voltage is greater than the battery voltage; a driver circuit coupled to receive the battery voltage from the rechargeable battery; and a driver enable circuit that enables the driver circuit entirely in response to the solar cell voltage becoming less than a first voltage.

In another embodiment, a method of forming circuit 150 includes configuring the light control circuit to receive a solar voltage from a solar cell; configuring the light control circuit to receive a battery voltage from a battery; configuring the light control circuit to monitor the solar voltage and to monitor the battery voltage; and configuring the light control circuit to couple the solar cell to the battery to charge the battery responsively to the solar voltage being greater than the battery voltage.

Another exemplary embodiment of a method of forming circuit 150 includes configuring a first terminal of the light control circuit to couple to an inductor; configuring a second terminal of the light control circuit to couple to a battery to receive a battery voltage; configuring a third terminal of the light control circuit to receive a solar voltage from a solar cell; configuring an output terminal of the light control circuit for coupling to a light source and supplying a current to the light source; coupling a switching circuit between the first terminal and the output terminal; and configuring a driver circuit to control the switching circuit and activate a control signal if a voltage on the output terminal is greater than a voltage on the first terminal wherein the driver circuit decouples the output terminal from the first terminal responsively to activating the control signal.

Solar-powered light system 100 also generally includes a solar cell 101, a rechargeable battery 102, an inductor 127, a light source illustrated preferably as a light emitting diode (LED) 107, a resistor 129, and a capacitor 128, all of which typically are external to control circuit 150. As will be seen further hereinafter, control circuit 150 is configured to control the charging of battery 102 from solar cell 101, and circuit 150 is configured to control switching inductor 127 to increase the voltage applied to the light source such as by switching inductor 127. As illustrated, circuit 150 includes a battery charging circuit 103, a driver circuit 104, a driver enable circuit 105, and a low voltage disable circuit 106. Control circuit 150 also typically includes a battery terminal 136, a solar cell terminal 137, an inductor terminal 141, an output voltage terminal or output terminal 142, and a common return terminal or return 109.

In the described embodiments, rechargeable battery 102 is a conventional low voltage device. For example, rechargeable battery 102 may provide a nominal output voltage ($V_{BATT}$) of about 1.2 Volts when fully charged. For purposes of the present disclosure, the term 'low voltage' usually refers to voltages of less than about 1.5 Volts.

Solar cell 101 is also a conventional device, which generates a voltage ($V_{SOLAR}$) when exposed to sunlight. In the described embodiments, solar cell 101 generates a voltage $V_{SOLAR}$ greater than about 1.5 Volts when exposed to full sunlight. This voltage $V_{SOLAR}$ decreases to zero volts when solar cell 101 is no longer exposed to sunlight.

Both rechargeable battery 102 and solar cell 101 are coupled to battery charging circuit 103. Battery charging circuit 103 includes p-channel charging transistor 110, comparator circuit 111, and source select circuit 112. In general, battery charging circuit 103 enables rechargeable battery 102 to be charged by coupling battery 102 to solar cell 101 when solar cell 101 is exposed to sunlight. As described in more detail below, battery charging circuit 103 maximizes the charging voltage applied to rechargeable battery 102.

Figure 2:
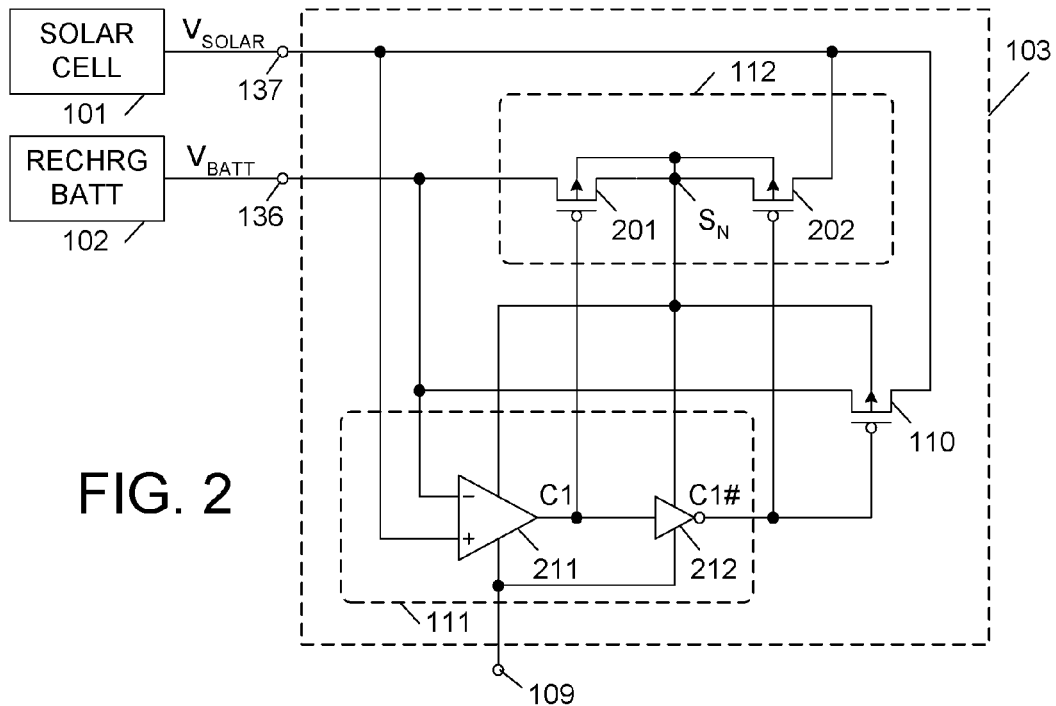
FIG. 2 schematically illustrates an embodiment of a portion of a battery charging circuit of the control circuit of FIG. 1, in accordance with the present invention.

FIG. 2 schematically illustrates an embodiment of a portion of battery charging circuit 103, which illustrates some details of comparator circuit 111 and source select circuit 112. Comparator circuit 111 includes comparator 211 and inverter 212. The positive (+) input terminal of comparator 211 is coupled to receive the solar cell voltage $V_{SOLAR}$, and the negative (−) input terminal of comparator 211 is coupled to receive the battery voltage $V_{BATT}$. As a result, comparator 211 provides an output signal C1 having a logic high state if $V_{SOLAR}$ is greater than $V_{BATT}$. Conversely, comparator 211 provides a logic low output signal C1 if $V_{SOLAR}$ is less than $V_{BATT}$. Inverter 212, which is coupled to the output of comparator 211, provides an output signal C1# having a logic state opposite the logic state of output signal C1.

Source select circuit 112 includes p-channel transistors 201 and 202, which are connected in series between rechargeable battery 102 and solar cell 101. More specifically, the sources of p-channel transistors 201 and 202 are coupled to rechargeable battery 102 and solar cell 101, respectively. The drains and n-type body regions of p-channel transistors 201 and 202 are commonly coupled to a node $S_N$. Node $S_N$ is further coupled to voltage supply terminals of comparator 211 and inverter 212, as well as to the n-type body region of p-channel charging transistor 110. The gates of p-channel transistors 201 and 202 are coupled to receive the output signals C1 and C1#, respectively, from comparator circuit 111.

P-channel charging transistor 110 is coupled between rechargeable battery 102 and solar cell 101. More specifically, the source of p-channel charging transistor 110 is coupled to receive the solar cell voltage $V_{SOLAR}$ from solar cell 101, and the drain of p-channel charging transistor 110 is coupled to receive the battery voltage $V_{BATT}$ from rechargeable battery 102. The gate of p-channel charging transistor 110 is coupled to receive the output signal C1# from comparator circuit 111.

In one embodiment, battery charging circuit 103 operates in the following manner. When the solar cell 101 is exposed to sufficient sunlight, the solar cell voltage $V_{SOLAR}$ will be relatively large (e.g., greater than 1.5 Volts). This operating condition is hereinafter referred to as the charging mode. When the solar cell voltage $V_{SOLAR}$ is greater than the battery voltage $V_{BATT}$, the output signals C1 and C1# provided by comparator circuit 111 have logic high and logic low states, respectively. The logic high output signal C1 turns off p-channel transistor 201. The logic low output signal C1# turns on p-channel transistors 202 and 110. Turning on p-channel charging transistor 110 electrically connects solar cell 101 to rechargeable battery 102. Because the solar cell voltage $V_{SOLAR}$ is greater than the battery voltage $V_{BATT}$, rechargeable battery 102 is charged from solar cell 101 under these conditions. P-channel transistor 110 advantageously allows the full solar cell voltage $V_{SOLAR}$ to be applied to the rechargeable battery (i.e., $V_{BATT}=V_{SOLAR}$). This represents an improvement over prior art battery charging circuits that use a diode (or diode-connected transistor) to charge a battery, because such diodes (or diode connected transistors) introduce a voltage drop of about 0.7 Volts.

Turning on p-channel transistor 202 causes the solar cell voltage $V_{SOLAR}$ to be applied to node $S_N$. As a result, comparator 211 and inverter 212 are powered by the solar cell voltage $V_{SOLAR}$. The logic high output signal C1 provided by comparator 211 therefore has a voltage equal to the solar cell voltage $V_{SOLAR}$. In addition, the body regions of p-channel transistors 201-202 and 110 are biased to the solar cell voltage $V_{SOLAR}$ at this time. Biasing the gate and body regions of p-channel transistor 201 with the high solar cell voltage $V_{SOLAR}$ advantageously minimizes leakage through this turned off transistor during the charging mode.

When the solar cell 101 is not exposed to sufficient sunlight, the solar cell voltage $V_{SOLAR}$ will drop below the battery voltage $V_{BATT}$. This operating mode is hereinafter referred to as the non-charging mode. When the solar cell voltage $V_{SOLAR}$ is less than the battery voltage $V_{BATT}$, the output signals C1 and C1# provided by comparator circuit 111 have logic low and logic high states, respectively. The logic high output signal C1# turns off p-channel transistors 110 and 202. Turning off p-channel charging transistor 110 electrically disconnects rechargeable battery 102 from solar cell 101, thereby preventing rechargeable battery 102 from discharging through transistor 110.

The logic low output signal C1 turns on p-channel transistor 201. Turning on p-channel transistor 201 causes the battery voltage $V_{BATT}$ to be applied to node $S_N$. As a result, comparator 211 and inverter 212 are powered by the battery voltage $V_{BATT}$ at this time. The logic high output signal C1# provided by inverter 212 therefore has a voltage equal to the battery voltage $V_{BATT}$. In addition, the body regions of p-channel transistors 201-202 and 110 are biased to the battery voltage $V_{BATT}$ at this time. Biasing the gate and body regions of p-channel transistors 202 and 110 with the high battery voltage $V_{BATT}$ advantageously minimizes leakage through these turned off transistors during the non-charging mode.

Note that voltage on node $S_N$ will always be equal to the larger of the solar cell voltage $V_{SOLAR}$ and the battery voltage $V_{BATT}$, thereby minimizing leakage through turned off p-channel transistors in battery charging circuit 103. In one embodiment, the body regions of all p-channel transistors in system 100 are biased by the voltage on node $S_N$, thereby further minimizing leakage in system 100.

Returning now to FIG. 1, driver circuit 104 includes reference voltage circuit 121, comparators 122-123, clock generation circuit or clock generator 124, switching logic 125, internal voltage select logic or internal voltage select circuit 126, and switch circuit 130. Switch circuit 130 includes n-channel switching transistor 131 and p-channel switching transistor 132. In one embodiment, battery charging circuit 103, driver enable circuit 105, low voltage disable circuit 106, reference voltage circuit 121, comparators 122-123, clock generation circuit 124, switching logic 125, internal voltage select circuit 126, and switching circuit 130 are all fabricated on the same integrated circuit chip. In some embodiments, resistor 129 may be replaced by a substantially constant current source. In another embodiment, resistor 129, or the current source, may be formed on the same semiconductor die with circuit 150.

Driver enable circuit 105 is configured to receive the solar cell voltage $V_{SOLAR}$ from solar cell 101. In the described embodiment, driver enable circuit 105 is a level detector, which determines whether the solar cell voltage $V_{SOLAR}$ is less than a predetermined threshold voltage $V_{T1}$. If the solar cell voltage $V_{SOLAR}$ is greater than the predetermined threshold voltage $V_{T1}$, drive enable circuit 105 deactivates an output signal EA# to a logic high state, thereby disabling driver circuit 104. If the solar cell voltage $V_{SOLAR}$ decreases below the predetermined threshold voltage $V_{T1}$, drive enable circuit 105 activates the output signal EA# to a logic low state, thereby enabling driver circuit 104.

Figures 3, 4:
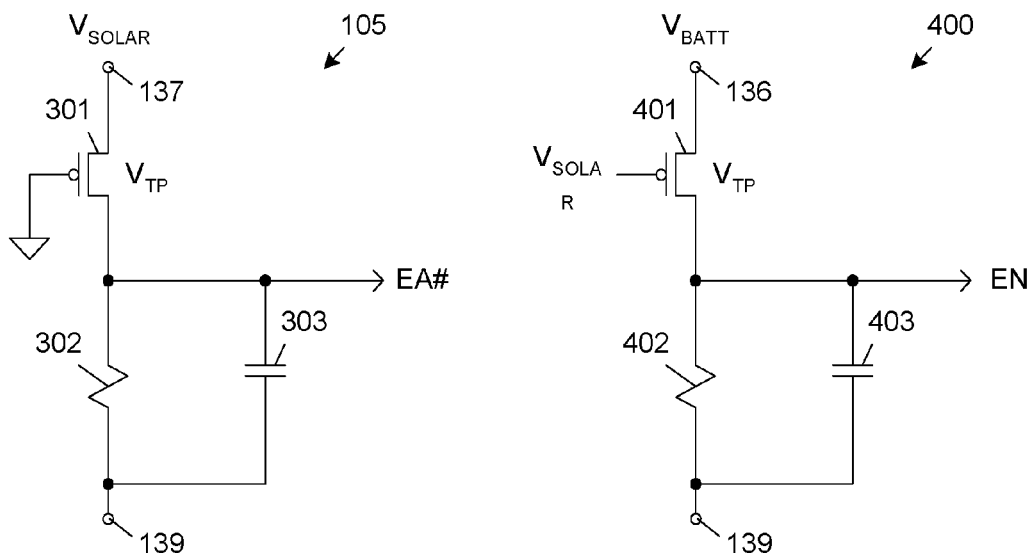
FIG. 3 schematically illustrates an embodiment of a portion of a driver enable circuit of the control circuit in accordance with the present invention.
FIG. 4 schematically illustrates an embodiment of a portion of a driver enable circuit of the control circuit in accordance with an alternate embodiment of the present invention.

FIG. 3 schematically illustrates an embodiment of a portion of driver enable circuit 105. Driver enable circuit 105 includes p-channel transistor 301, resistor 302, and capacitor 303. When the solar cell voltage $V_{SOLAR}$ is greater than the threshold voltage $V_{T1}$ of p-channel transistor 301 (as will be true when the solar cell 101 is exposed to sunlight), transistor 301 turns on, thereby charging capacitor 303. In the described embodiment, p-channel transistor 301 is designed to have a threshold voltage $V_{T1}$ of about 0.4 Volts. When transistor 301 is turned on, the enable signal EA# increases to a logic high voltage. The logic high enable signal EA# disables voltage reference circuit 121, comparators 122-123, clock generation circuit 124 and internal voltage select circuit 126, thereby disabling driver circuit 104. By disabling the above-described circuits, driver circuit 104 advantageously does not consume power while solar cell 101 is exposed to sunlight (i.e., during periods when LED 107 is not being driven).

When the solar cell voltage $V_{SOLAR}$ is less than the threshold voltage $V_{T1}$ of p-channel transistor 301 (as will be true when solar cell 101 is not exposed to sunlight), transistor 301 turns off, thereby causing capacitor 303 to discharge through resistor 302. Under these conditions, the enable signal EA# drops to a logic low voltage (Close to the voltage of return 109). The logic low enable signal EA# enables voltage reference circuit 121, comparators 122-123, clock generation circuit 124 and internal voltage select circuit 126, thereby enabling driver circuit 104. Note that driver enable circuit 105 operates only in response to the solar cell voltage $V_{SOLAR}$, thereby simplifying the design of circuit 105.

Low voltage disable circuit 106 is configured to receive the battery voltage $V_{BATT}$ from rechargeable battery 102. In the described embodiment, low voltage disable circuit 106 is a level detector, similar to driver enable circuit 105 (FIG. 3), except that the battery voltage $V_{BATT}$ is applied in place of the solar cell voltage $V_{SOLAR}$. Low voltage disable circuit 106 determines whether the battery voltage $V_{BATT}$ is less than a predetermined threshold voltage $V_{T2}$. If the battery voltage $V_{BATT}$ is less than the predetermined threshold voltage $V_{T2}$, low voltage disable circuit 106 activates a disable control signal DIS# to a logic low state. When the disable control signal DIS# is activated low, driver circuit 104 is disabled. Disabling driver circuit 104 in this manner prevents driver circuit 104 from being supplied from the rechargeable battery 102 when the battery voltage $V_{BATT}$ is very low. This prevents the deep discharge of rechargeable battery 102, which could cause irreversible damage to the battery (i.e., the battery may never be able to recharge). In one embodiment, the predetermined threshold voltage $V_{T2}$ is selected to have a value of about 0.7 Volts.

Note that if the battery voltage $V_{BATT}$ is greater than the predetermined threshold voltage $V_{T2}$, low voltage disable circuit 106 deactivates the disable control signal DIS# to a logic high state. When the disable control signal DIS# is deactivated high, and the enable signal EA# is activated low in the manner described above, internal voltage select circuit 126 will provide an internal supply voltage VDD_INT that is the higher of the battery voltage $V_{BATT}$ or the output voltage $V_{OUT}$.

In the manner described above, driver circuit 104 is enabled during nighttime conditions (i.e., $V_{SOLAR} < V_{T1}$), as long as the rechargeable battery 102 has been charged to a predetermined voltage (i.e., $V_{BATT} > V_{T2}$).

FIG. 4 schematically illustrates an embodiment of a portion of an enable/disable circuit 400 which is an alternate embodiment that can be used to replace both driver enable circuit 105 and low voltage disable circuit 106. In this embodiment, enable/disable circuit 400 includes a p-channel transistor 401, a resistor 402, and a capacitor 403, which are connected in the manner illustrated. The solar cell voltage $V_{SOLAR}$ is applied to the gate of p-channel transistor 401, and the battery voltage $V_{BATT}$ is applied to the source of p-channel transistor 401.

P-channel transistor 401 will turn on when the battery voltage $V_{BATT}$ is greater than the solar cell voltage $V_{SOLAR}$ by an amount greater than the threshold voltage $V_{TP}$ of transistor 401. When transistor 401 is turned on, capacitor 403 charges, and the enable signal EN increases to a logic high voltage. In this embodiment, the logic high enable signal EN enables voltage reference circuit 121, comparators 122-123, clock generation circuit 124 and internal voltage select circuit 126, thereby enabling driver circuit 104.

The threshold voltage $V_{TP}$ of transistor 401 is selected to prevent transistor 401 from turning on if the battery voltage $V_{BATT}$ is below a predetermined voltage level, thereby preventing the deep discharge of battery 102. For example, if the threshold voltage $V_{TP}$ of transistor 401 is designed to be 0.7 Volts, then transistor 401 will be prevented from turning on at battery voltages less than 0.7 Volts (because the solar cell voltage $V_{SOLAR}$ has a minimum voltage of zero volts). In this manner, circuit 400 provides low voltage discharge protection.

If the battery voltage $V_{BATT}$ is 1.2 Volts (e.g., a normal output voltage for charged battery 102), then p-channel transistor 401 will turn on as long as the solar cell voltage $V_{SOLAR}$ is less than 0.5 Volts (i.e., $V_{BATT} - V_{SOLAR} > V_{TP}$). In this manner, circuit 400 enables driver circuit 104 when solar cell 101 is not exposed to significant sunlight.

When the solar cell voltage $V_{SOLAR}$ plus the threshold voltage $V_{TP}$ of transistor 401 is greater than the battery voltage $V_{BATT}$ (as will be true when the solar cell 101 is exposed to sunlight), p-channel transistor 401 turns off, thereby causing capacitor 403 to discharge through resistor 402. Under these conditions, enable signal EN drops to a logic low voltage. The logic low of enable signal EN disables voltage reference circuit 121, comparators 122-123, clock generation circuit 124, and internal voltage select circuit 126, thereby disabling driver circuit 104.

Although enable/disable circuit 400 operates only in response to both the solar cell voltage $V_{SOLAR}$ and the battery voltage $V_{BATT}$, this circuit 400 may replace two circuits 105-106, thereby simplifying the design of system 100.

When driver circuit 104 is initially enabled, a comparator present within internal voltage select circuit 126 compares the battery voltage $V_{BATT}$ with the output voltage $V_{OUT}$, and determines that the battery voltage $V_{BATT}$ is greater than the output voltage $V_{OUT}$ (which is initially close to zero volts). The comparator within circuit 126 may be another circuit similar to comparator 211 which instead compares $V_{BATT}$ with $V_{OUT}$. In response, internal voltage select circuit 126 routes the battery voltage $V_{BATT}$ as the internal supply voltage VDD_INT.

The internal supply voltage VDD_INT supplies reference voltage circuit 121, comparators 122-123, clock generation circuit 124 and switching logic 125. When enabled, reference voltage circuit 121 generates a constant reference voltage $V_{REF}$. In one embodiment, reference voltage circuit 121 uses a programmable floating gate reference to generate the reference voltage $V_{REF}$. Example of programmable floating gate references are described in U.S. Pat. Nos. 7,245,536 and 7,149,123, which is hereby incorporated by reference. In other embodiments, reference voltage circuit 121 may implement a bandgap reference to generate the reference voltage $V_{REF}$. Note, however, that a programmable floating gate reference is capable of operating in response to lower supply voltages. In the described embodiments, the reference voltage $V_{REF}$ is selected to correspond with a desired feedback voltage $V_{FB}$, which is developed across resistor 129 when LED 107 is driven in the desired manner.

The reference voltage $V_{REF}$ is provided to the positive input terminal of comparator 122. The negative input terminal of comparator 122 is coupled to receive the feedback voltage $V_{FB}$. Initially, the reference voltage $V_{REF}$ is greater than the feedback voltage $V_{FB}$ (which is close to zero volts), thereby causing comparator 122 to provide a logic high signal (which is initially equal to the battery voltage $V_{BATT}$) to clock generator 124.

Clock generator 124 is activated in response to the logic high signal received from comparator 122. When activated, clock generator 124 generates an output clock signal CLK, which changes states at a predetermined frequency. In one embodiment, the output clock signal has a frequency of about two (2) MHz when clock generator 124 is activated. The signal swing of the clock signal CLK is determined by the internal supply voltage VDD_INT. That is, the clock signal CLK has a signal swing between zero volts and the internal supply voltage VDD_INT. Because the internal supply voltage VDD_INT is initially equal to the battery voltage $V_{BATT}$, the clock signal CLK initially has a signal swing between zero volts and the battery voltage $V_{BATT}$. Clock generator 124 provides the clock signal CLK to switching logic 125.

Switching logic 125 selectively routes the received clock signal CLK in response to a control voltage $V_C$ provided by comparator 123. As described in more detail below, the control voltage $V_C$ initially has a logic high state. Under these conditions, switching logic 125 routes the clock signal CLK to the gates of n-channel switching transistor 131 and p-channel switching transistor 132 as signals $N_{SW}$ and $P_{SW}$, respectively. N-channel switching transistor 131 is connected between terminal 141, thus inductor 127, and return 109. P-channel switching transistor 132 is coupled between terminal 141, thus inductor 127, and output terminal 142 of driver circuit 104. The inductor terminal voltage is labeled $V_{LX}$.

During a first phase of each cycle of the CLK signal, the CLK signal has a logic high state, such that n-channel switching transistor 131 is turned on and p-channel switching transistor 132 is turned off. Under these conditions, inductor 127 is charged by the battery 102 via the conductive path to ground provided by the turned on n-channel switching transistor 131.

During a second phase of each cycle of the CLK signal, the CLK signal has a logic low state, such that n-channel switching transistor 131 is turned off, and p-channel switching transistor 132 is turned on, thereby allowing inductor 127 to discharge through p-channel switching transistor 132 to LED 107 (and capacitor 128). As these charging and discharging operations are repeated during successive cycles of the clock signal CLK, the output voltage $V_{OUT}$ gradually increases. Note that as the output voltage $V_{OUT}$ increases, the feedback voltage $V_{FB}$ also increases.

Eventually, the output voltage $V_{OUT}$ is boosted to a voltage greater than the battery voltage $V_{BATT}$. The comparator present within internal voltage select circuit 126 compares the battery voltage $V_{BATT}$ with the output voltage $V_{OUT}$, and determines that the output voltage $V_{OUT}$ is greater than the battery voltage $V_{BATT}$. In response, internal voltage select circuit 126 stops routing the battery voltage $V_{BATT}$ as the internal supply voltage VDD_INT, and begins routing the output voltage $V_{OUT}$ as the internal supply voltage VDD_INT. In this manner, the internal voltage select circuit 126 routes the higher of the battery voltage $V_{BATT}$ and the output voltage $V_{OUT}$ as the internal supply voltage VDD_INT (as long as the enable control signal EA# is activated low, and the disable control signal DIS# is not activated low). As the output voltage $V_{OUT}$ rises, the internal supply voltage VDD_INT rises, thereby causing the logic high states of the output signals of comparators 122-123, clock generation circuit 124 and switching logic 125 to similarly rise. In one embodiment, the internal supply voltage VDD_INT is used to bias the body regions of p-channel transistors present in driver circuit 104, thereby minimizing leakage in these transistors.

In the described embodiments, driver circuit 104 operates as a boost converter that generates a boosted output voltage $V_{OUT}$ of about 3.5 to 3.6 Volts in response to a battery voltage $V_{BATT}$ of about 1.2 Volts. To achieve this boost, the required duty cycle of the CLK signal is equal to $(V_{OUT} - V_{BATT})/V_{OUT}$, or about 60 to 66%. (i.e., 60-66% of each clock cycle is high and 34-40% of each clock cycle is low).

As the output current through LED 107 rises, the feedback voltage $V_{FB}$ developed across resistor 129 also rises. The resistance of resistor 129 is selected such that when the desired drive current is provided to LED 107, the feedback voltage $V_{FB}$ is approximately equal to the reference voltage $V_{REF}$. When the drive current provided to LED 107 becomes higher than the desired level, then the feedback voltage $V_{FB}$ becomes greater than the reference voltage $V_{REF}$. As can be seen, the feedback voltage $V_{FB}$ is representative of the value of the current through LED 107. When the feedback voltage $V_{FB}$ exceeds the reference voltage $V_{REF}$, the output signal provided by comparator 122 transitions to a logic low state. Clock generator 124 is de-activated in response to the logic low output signal provided by comparator 122. While de-activated, clock generator 124 provides a logic low output clock signal CLK, approximately equal to the voltage of return 109 (zero volts). Under these conditions, n-channel switching transistor 131 is turned off and p-channel switching transistor 132 is turned on. As a result, inductor 127 will discharge through p-channel switching transistor 132. As described in more detail below, when inductor 127 is fully discharged, p-channel switching transistor 132 is turned off under the control of comparator 123. At this time, the output voltage $V_{OUT}$ (and therefore the feedback voltage $V_{FB}$) begins to decay.

When the feedback voltage $V_{FB}$ becomes less than the reference voltage $V_{REF}$, the output signal provided by comparator 122 transitions back to a logic high state. In response, clock generator 124 is re-activated (i.e., provides an output clock signal CLK that periodically transitions between ground and the internal supply voltage VDD_INT). Under these conditions, the above-described charging and discharging phases of inductor 127 resume, thereby causing the output voltage $V_{OUT}$ to increase, such that above-described cycle repeats. In this manner, LED 107 is driven in a desired and controlled manner. In addition, de-activating clock generator 124 when the feedback voltage $V_{FB}$ exceeds the reference voltage $V_{REF}$ advantageously reduces power consumption within driver circuit 104.

The operation of comparator 123 will now be described. The positive (+) input terminal of comparator 123 is coupled to receive the inductor voltage $V_{LX}$, and the negative (−) input terminal of comparator 123 is coupled to receive the output voltage $V_{OUT}$. As a result, comparator 123 provides an output signal $V_C$ having a logic high state if the inductor voltage $V_{LX}$ is greater than the output voltage $V_{OUT}$. Conversely, comparator 123 provides a logic low output signal $V_C$ if the inductor voltage $V_{LX}$ is less than the output voltage $V_{OUT}$.

As described above, when the clock signal CLK has a logic low state, p-channel switching transistor 132 is turned on (and n-channel switching transistor 131 is turned off), thereby allowing the previously charged inductor 127 to discharge through p-channel switching transistor 132 to drive LED 107 (and charge capacitor 128). While inductor 127 is discharging in this manner, the inductor voltage $V_{LX}$ will be greater than the output voltage $V_{OUT}$, and the output signal $V_C$ provided by comparator 123 will have a logic high state.

However, it is possible that inductor 127 may be fully discharged while p-channel switching transistor 132 remains turned on (i.e., before the clock signal CLK transitions back to a logic high state). If inductor 127 has fully discharged while p-channel switching transistor 132 is turned on, then capacitor 128 will attempt to charge inductor 127, reversing the flow of charge through turned on p-channel switching transistor 132. Under these conditions, the output voltage $V_{OUT}$ will become greater than the inductor voltage $V_{LX}$, and the output signal $V_C$ provided by comparator 123 will transition to a logic low state.

Switching logic 125 monitors both the output signal $V_C$ of comparator 123 and the clock signal CLK to determine if the output signal $V_C$ transitions to a logic low state while the clock signal CLK has a logic low state. If switching logic 125 determines that the output signal $V_C$ transitions to a logic low state while the clock signal CLK has a logic low state, then switching logic 125 de-asserts the switching signal $P_{SW}$ to a logic high state, thereby turning off p-channel switching transistor 132. Turning off p-channel switching transistor 132 in this manner prevents charge from flowing from capacitor 128 back into inductor 127 through p-channel switching transistor 132. When the clock signal CLK transitions to a logic high state, switching logic 125 again routes the clock signal CLK as the switching signals $P_{SW}$ and $N_{SW}$. Controlling p-channel switching transistor 132 in this manner advantageously increases the efficiency of driver circuit 104.

Figure 5:
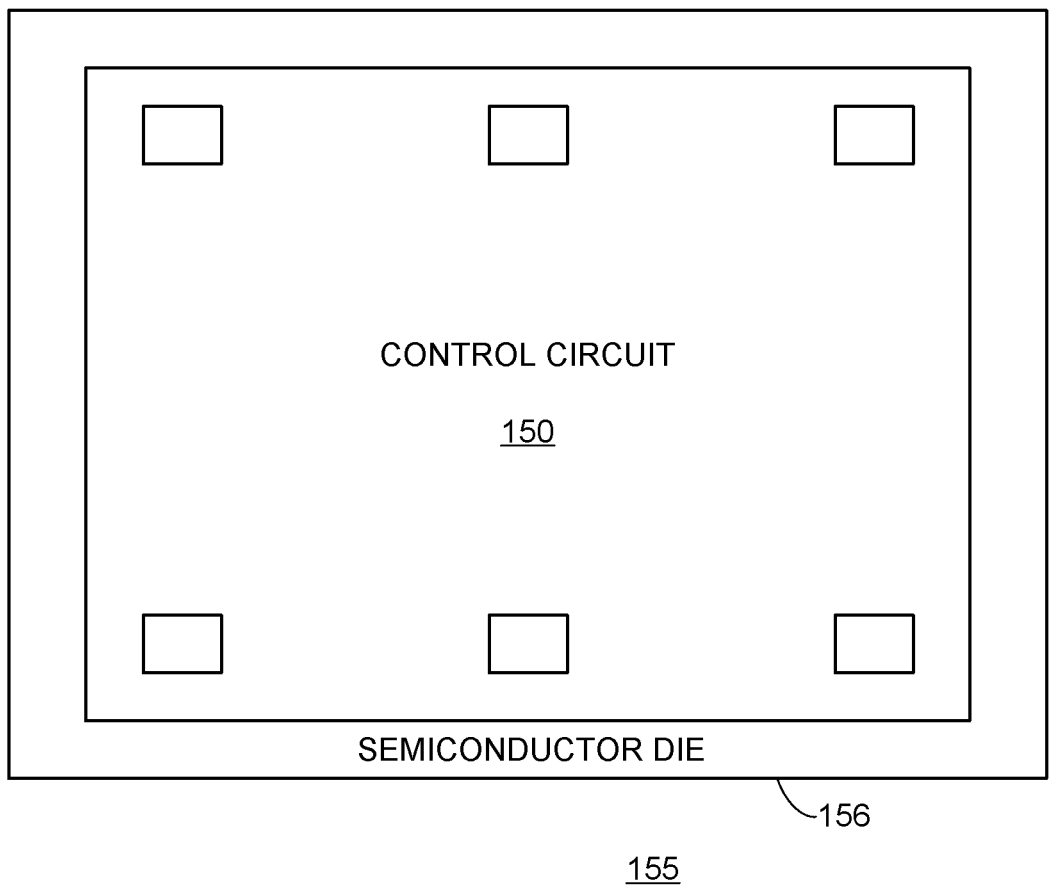
FIG. 5 illustrates an enlarged plan view of a portion of an embodiment of a semiconductor device or integrated circuit that includes the control circuit of FIG. 1 in accordance with the present invention.

FIG. 5 illustrates an enlarged plan view of a portion of an embodiment of a semiconductor device or integrated circuit 155 that is formed on a semiconductor die 156. Control circuit 150 is formed on die 156. Die 156 may also include other circuits that are not shown in FIG. 5 for simplicity of the drawing. Control circuit 150 and device or integrated circuit 155 are formed on die 156 by semiconductor manufacturing techniques that are well known to those skilled in the art. In one embodiment, circuit 150 is formed on a semiconductor substrate as an integrated circuit having six external leads. In another embodiment, circuit 150 is formed on a semiconductor substrate as an integrated circuit having eight external leads.

Although the invention has been described in connection with several embodiments, it is understood that this invention is not limited to the embodiments disclosed, but is capable of various modifications, which would be apparent to one of ordinary skill in the art. Accordingly, the present invention is only limited by the following claims.

The invention claimed is:

1. A control circuit comprising:
   a battery charging circuit coupled to receive a solar cell voltage from a solar cell and a battery voltage from a rechargeable battery, wherein the battery charging circuit is configured to charge the rechargeable battery from the solar cell when the solar cell voltage is greater than the battery voltage;
   a driver circuit coupled to receive the battery voltage from the rechargeable battery;
   a driver enable circuit that enables the driver circuit entirely in response to the solar cell voltage becoming less than a first voltage; and
   an output terminal of the driver circuit configured to be coupled to a light source, wherein the driver circuit, when enabled, drives an output current to the output terminal, thereby developing an output voltage on the output terminal, and wherein the driver circuit includes a comparator coupled to receive the battery voltage and the output voltage, the comparator is configured to select a supply voltage for the driver circuit to be the larger of the battery voltage or the output voltage when the driver circuit is enabled.

2. The circuit of claim 1, wherein the driver enable circuit includes a first transistor coupled to receive the solar cell voltage, the first transistor having a first threshold voltage that corresponds with the first voltage.

3. The circuit of claim 1, further comprising a low voltage disable circuit that disables the driver circuit entirely in response to the battery voltage becoming less than a second voltage.

4. The circuit of claim 3, wherein the first voltage is less than the second voltage.

5. The circuit of claim 3, wherein the low voltage disable circuit includes a transistor coupled to receive the battery voltage, the transistor having a threshold voltage that corresponds with the second voltage.

6. A control circuit comprising:
   a battery charging circuit coupled to receive a solar cell voltage from a solar cell and a battery voltage from a rechargeable battery, wherein the battery charging circuit is configured to charge the rechargeable battery from the solar cell when the solar cell voltage is greater than the battery voltage;

a driver circuit coupled to receive the battery voltage from the rechargeable battery;

a driver enable circuit that enables the driver circuit entirely in response to the solar cell voltage becoming less than a first voltage;

an output terminal of the driver circuit configured for being coupled to an LED wherein the driver circuit, when enabled, drives an output current through the output terminal;

a feedback terminal of the driver circuit configured to receive a feedback signal that is representative of the output current;

a reference voltage circuit configured to generate a reference voltage corresponding with a desired value of the feedback signal;

a comparator coupled to receive the reference voltage and the feedback signal; and a clock generation circuit configured to be enabled and disabled in response to an output signal provided by the comparator.

7. The circuit of claim 6, wherein the output current develops an output voltage on the output terminal of the driver circuit, and further including a voltage supply select circuit for supplying the reference voltage circuit, the comparator and the clock generation circuit with the larger of the battery voltage or the output voltage.

8. The circuit of claim 6, wherein the clock generation circuit is configured to be enabled responsively to the reference voltage being greater than the feedback signal; and wherein the clock generation circuit is configured to be disabled responsively to the feedback voltage being greater than the reference voltage.

9. A control circuit comprising:
a battery charging circuit coupled to receive a solar cell voltage from a solar cell and a battery voltage from a rechargeable battery, wherein the battery charging circuit is configured to charge the rechargeable battery from the solar cell when the solar cell voltage is greater than the battery voltage, the battery charging circuit including,
a charging transistor,
a comparator circuit,
a first switching transistor having a source configured for coupling to the solar cell, a drain and a body region coupled to a body region of the charging transistor, and a gate coupled to an output terminal of the comparator circuit, and
a second switching transistor having a source configured for coupling to the rechargeable battery, a drain and a body region coupled to the body region of the charging transistor, and a gate coupled to the output terminal of the comparator circuit;
a driver circuit coupled to receive the battery voltage from the rechargeable battery; and
a driver enable circuit that enables the driver circuit entirely in response to the solar cell voltage becoming less than a first voltage wherein the driver enable circuit is configured to disable the driver circuit from consuming power from the solar cell responsively to the solar cell voltage being greater than the first voltage.

10. A method of forming a light control circuit comprising:
configuring the light control circuit to receive a solar voltage from a solar cell;
configuring the light control circuit to receive a battery voltage from a battery;
configuring the light control circuit to monitor the solar voltage and to monitor the battery voltage;
configuring the light control circuit to couple the solar cell to the battery to charge the battery and to power the light control circuit from the solar voltage responsively solely to the solar voltage being greater than the battery voltage;
configuring a driver circuit to receive the battery voltage from the rechargeable battery wherein the light control circuit is configured to enable the driver circuit entirely in response to the solar cell voltage becoming less than a first voltage;
configuring the driver circuit to supply an output current to a light source and form an output voltage, configuring a comparator of the driver circuit to receive the battery voltage and the output voltage and to select a supply voltage for the driver circuit to be the larger of the battery voltage or the output voltage when the driver circuit is enabled; and
configuring the light control circuit to decouple the solar cell from the battery and to power the light control circuit from the battery voltage responsively solely to the solar voltage being less than the battery voltage.

11. The method of claim 10 wherein configuring the light control circuit to couple the solar cell to the battery includes coupling a charging transistor to the solar cell and to the battery.

12. A method of forming a light control circuit comprising:
configuring the light control circuit to receive a solar voltage from a solar cell;
configuring the light control, circuit to receive a battery voltage from a battery;
coupling a charging transistor to the solar cell and to the battery;
configuring the light control circuit to monitor the solar voltage and to monitor the battery voltage;
configuring the light control circuit to couple the solar cell to the battery to charge the battery responsively to the solar voltage being greater than the battery voltage; and
configuring the light control circuit to turn on the charging transistor and bias a body region of the charging transistor with the solar voltage responsively to the solar voltage exceeding the battery voltage, and to turn off the charging transistor and biasing the body region of the charging transistor with the battery voltage responsively to the solar voltage being less than the battery voltage.

13. The method of claim 12, further including coupling a comparator to receive the solar voltage and the battery voltage;
coupling a source of a first switching transistor to receive the solar voltage, and coupling a drain and a body region of the first switching transistor to a body region of the charging transistor, and coupling a gate of the first switching transistor to the comparator; and
coupling a source of a second switching transistor to receive the battery voltage, coupling a drain and a body region of the second switching transistor to the body region of the charging transistor, and coupling a gate second switching transistor to the comparator.

14. A method of forming a light control circuit comprising:
configuring a first terminal of the light control circuit to couple to an inductor;
configuring a second terminal of the light control circuit to couple to a battery to receive a battery voltage;

configuring a third terminal of the light control circuit to receive a solar voltage from a solar cell;

configuring an output terminal of the light control circuit for coupling to a light source and supplying a current to the light source;

coupling a switching circuit between the first terminal and the output terminal including coupling a comparator to the first terminal and the output terminal;

configuring a driver circuit to control the switching circuit and activate a control signal if a voltage received from the battery is greater than a voltage received from the solar cell wherein the comparator activates the control signal responsively to the voltage on the output terminal being greater than the voltage on the first terminal and wherein the driver circuit decouples the output terminal from the first terminal responsively to activating the control signal; and configuring the light control circuit to enable the driver circuit entirely in response to the solar voltage becoming less than a first voltage, and configuring the light control circuit to disable the driver circuit responsively to the solar voltage being greater than the first voltage.

15. The method of claim 14 wherein coupling the switching circuit includes coupling a first switch between the first terminal and a voltage return terminal of the light control circuit, and coupling a second switch between the first terminal and the output terminal, and further including configuring the driver circuit to disable the second switch responsively to activating the control signal.

16. The method of claim 15 further including configuring the driver circuit to enable the first switch, responsively to an inactive state of the control, signal, to charge the inductor during a first phase of a clock signal; and configuring the driver circuit to enable the second switch, responsively to the inactive state of the control signal, to discharge the inductor to the output terminal during a second phase of the clock signal.

17. The method of claim 14 further including configuring a battery charging circuit of the light control circuit to receive the solar voltage and the battery voltage and charge the battery from the soar cell responsively to the solar voltage having a greater value than the battery voltage.

18. A method of forming a light control circuit comprising:

configuring a first terminal of the light control circuit to couple to an inductor;

configuring a second terminal of the light control circuit to couple to a battery to receive a battery voltage;

configuring a third terminal of the light control circuit to receive a solar voltage from a solar cell;

configuring an output terminal of the light control circuit for coupling to a light source and supplying a current to the light source;

coupling a switching circuit between the first terminal and the output terminal;

configuring a driver circuit to control the switching circuit and activate a control signal if a voltage on the output terminal is greater than a voltage on the first terminal wherein the driver circuit decouples the output terminal from the first terminal responsively to activating the control signal; and an enable circuit that includes a transistor having a first threshold voltage wherein the enable circuit enables the driver circuit in response to the battery voltage exceeding the solar voltage by at least the first threshold voltage, and wherein the enable circuit disables the driver circuit in response to the battery voltage not exceeding the solar voltage by at least the first threshold voltage.

* * * * *

UNITED STATES PATENT AND TRADEMARK OFFICE
CERTIFICATE OF CORRECTION

| | |
|---|---|
| PATENT NO. | : 8,450,964 B2 |
| APPLICATION NO. | : 12/367667 |
| DATED | : May 28, 2013 |
| INVENTOR(S) | : Alexandra-Oana Petrouianu et al. |

Page 1 of 1

It is certified that error appears in the above-identified patent and that said Letters Patent is hereby corrected as shown below:

In the Claims

In Column 14, line 27, claim 18: Replace the phrase "an enable circuit that includes" with --configuring an enable circuit to include--.

Signed and Sealed this
Twelfth Day of May, 2015

Michelle K. Lee
*Director of the United States Patent and Trademark Office*